United States Patent
Nakahara et al.

(10) Patent No.: US 10,329,155 B2
(45) Date of Patent: Jun. 25, 2019

(54) MANUFACTURING METHOD FOR LITHIUM DIFLUOROPHOSPHATE POWDER, AND LITHIUM DIFLUOROPHOSPHATE

(71) Applicant: Central Glass Company, Limited, Ube-shi, Yamaguchi (JP)

(72) Inventors: Keita Nakahara, Ube (JP); Takayoshi Morinaka, Ube (JP); Yuta Ikeda, Ube (JP); Natsuya Nishimura, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 74 days.

(21) Appl. No.: 15/533,627

(22) PCT Filed: Nov. 17, 2015

(86) PCT No.: PCT/JP2015/082230
§ 371 (c)(1),
(2) Date: Jun. 6, 2017

(87) PCT Pub. No.: WO2016/093025
PCT Pub. Date: Jun. 16, 2016

(65) Prior Publication Data
US 2017/0334723 A1   Nov. 23, 2017

(30) Foreign Application Priority Data
Dec. 9, 2014   (JP) ................. 2014-248913

(51) Int. Cl.
C01B 25/455   (2006.01)
H01M 10/0567   (2010.01)

(52) U.S. Cl.
CPC ....... *C01B 25/455* (2013.01); *H01M 10/0567* (2013.01); *C01P 2006/80* (2013.01)

(58) Field of Classification Search
None
See application file for complete search history.

(56) References Cited

U.S. PATENT DOCUMENTS 8,293,411 B2   10/2012   Nishida et al.
8,728,657 B2   5/2014   Tsujioka et al.
(Continued)

FOREIGN PATENT DOCUMENTS

CN   108033435 A   5/2018
EP   2 826 747 A1   1/2015
(Continued)

OTHER PUBLICATIONS

International Search Report (PCT/ISA/210) issued in PCT Application No. PCT/JP2015/082230 dated Dec. 22, 2015 with English translation (five (5) pages).
(Continued)

*Primary Examiner* — Anthony J Zimmer
(74) *Attorney, Agent, or Firm* — Crowell & Moring LLP

(57) ABSTRACT

To provide a manufacturing method with which lithium difluorophosphate powder can be recovered from a lithium difluorophosphate solution. A method for manufacturing lithium difluorophosphate powder is used which includes the steps of precipitating solid lithium difluorophosphate by adding a poor solvent to a solution in which lithium difluorophosphate is dissolved in a main solvent, and obtaining lithium difluorophosphate powder by solid-liquid separation of the solid lithium difluorophosphate from the liquid containing the main solvent and the poor solvent, wherein the relational expression between the octanol/water partition coefficient $P_P$ of the main solvent and the octanol/water partition coefficient $P_A$ of the poor solvent is defined by the following formula (1).

$$P_A \geq -4/3 \times P_P + 1.2 \quad (1):$$

15 Claims, 1 Drawing Sheet

(56) References Cited

U.S. PATENT DOCUMENTS

| | | |
|---|---|---|
| 9,028,786 B2 | 5/2015 | Nishida et al. |
| 9,203,106 B2 | 12/2015 | Nishida et al. |
| 2010/0323240 A1 | 12/2010 | Tsujioka et al. |
| 2011/0111288 A1 | 5/2011 | Nishida et al. |
| 2011/0223089 A1 | 9/2011 | Nishida et al. |
| 2011/0223488 A1 | 9/2011 | Nishida et al. |
| 2013/0129595 A1* | 5/2013 | Schulz .................. C01B 25/455 423/301 |
| 2015/0064091 A1 | 3/2015 | Nishida et al. |

FOREIGN PATENT DOCUMENTS

| | | |
|---|---|---|
| EP | 2 842 908 A | 3/2015 |
| JP | 11-67270 A | 3/1999 |
| JP | 2008-222484 A | 9/2008 |
| WO | WO 2010/064637 A1 | 6/2010 |
| WO | WO 2013/023902 A1 | 2/2013 |
| WO | WO 2013/136533 A1 | 9/2013 |

OTHER PUBLICATIONS

Japanese-language Written Opinion (PCT/ISA/237) issued in PCT Application No. PCT/JP2015/082230 dated Dec. 22, 2015 (three (3) pages).

Extended European Search Report issued in counterpart European Application No. 15867035.6 dated Jul. 24, 2018 with English translation (six (6) pages).

\* cited by examiner

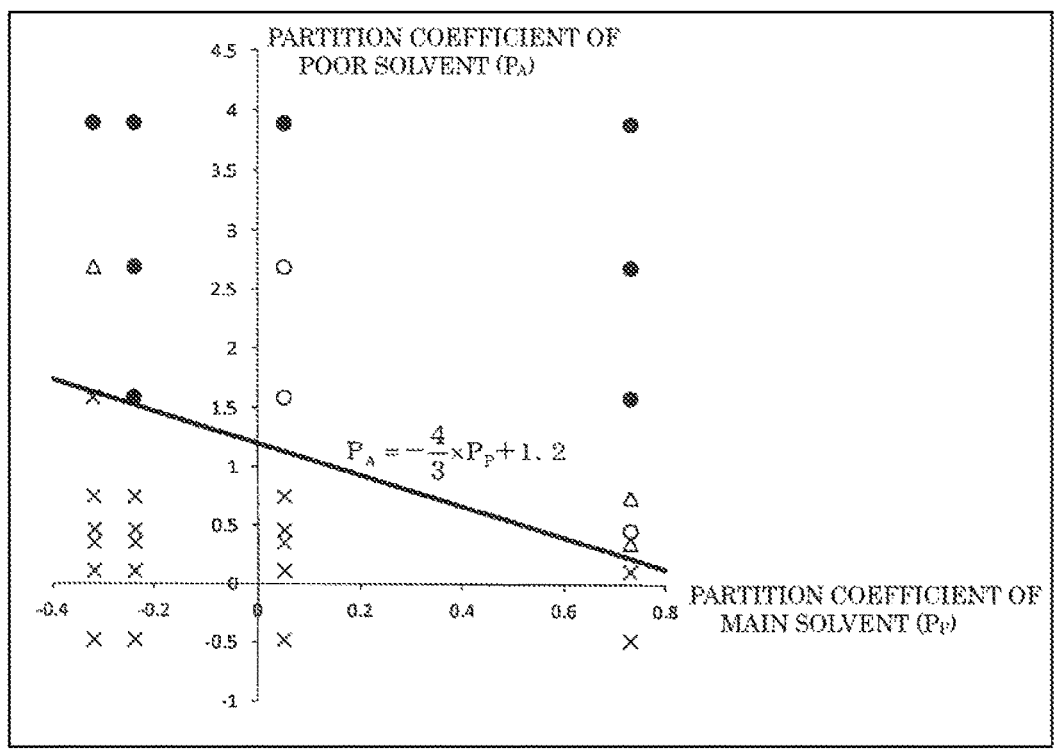

MANUFACTURING METHOD FOR LITHIUM DIFLUOROPHOSPHATE POWDER, AND LITHIUM DIFLUOROPHOSPHATE

TECHNICAL FIELD

The present invention relates to a method for manufacturing lithium difluorophosphate powder used for non-aqueous electrolyte batteries.

BACKGROUND TECHNOLOGY

In recent years, electrical storage systems for information-related equipment or telecommunication equipment, i.e., electrical storage systems for equipment having a small size and requiring a high energy density, such as personal computers, video cameras, digital still cameras and cellular phones, as well as electrical storage systems for equipment having a large size and requiring a high electric power, such as electric automobiles, hybrid vehicles, auxiliary power supplies for fuel cell vehicles and electricity storages, have been attracting attentions. As one of the candidates, non-aqueous electrolyte batteries have been actively developed, such as lithium ion batteries, lithium batteries, lithium ion capacitors, etc.

In general, in those non-aqueous electrolyte batteries, a non-aqueous electrolyte containing a non-aqueous solvent and a solute has been used as an ion conductor. The structure of the non-aqueous electrolyte is as follows. An aprotic mixed solvent in which one or several kinds selected from ethylene carbonate, propylene carbonate, dimethyl carbonate, diethyl carbonate and ethyl methyl carbonate had been mixed has been used as a non-aqueous solvent. A Lithium salt represented by, for example, $LiPF_6$, $LiBF_4$, $(CF_3SO_2)_2NLi$, $(C_2F_5SO_2)_2NLi$, etc. has been used as a solute.

Until no as a means for improving durability of non-aqueous electrolyte batteries, such as cycle characteristic and high temperature preservability, optimization of various constituent elements of a battery, such as active materials of cathode and anode, etc., has been considered. Technology related to non-aqueous electrolytes is not the exception, either. It has been suggested to suppress deterioration by various additives, deterioration which is caused by decomposing an electrolyte on the surface of active cathode and anode. For example, in a patent document 1, it has been described that high temperature cycle characteristic is improved by an effect of a film formed on an electrode interface when lithium difluorophosphate ($LiPO_2F_2$) is added to an electrolyte.

As a method for manufacturing lithium difluorophosphate used as an additive, a method in which halides other than fluoride, $LiPF_6$ and water are reacted in a non-aqueous solvent has been known (see a patent document 2).

In addition, in a patent document 3, for example, after reacting diphosphorus pentoxide, lithium hexafluorophosphate and hydrogen fluoride, a solution is concentrated, following which it is cooled down, and the crystal of lithium difluorophosphate is obtained. In a patent document 4, after reacting difluorophosphate and lithium chloride, a solution is cooled down, and the crystal of lithium difluorophosphate is precipitated.

In the method described in the patent document 2, a reaction liquid containing unreacted $LiPF_6$ and the produced lithium difluorophosphate can be used for preparing an electrolyte. However, there is a possibility that as a by-product produced by decomposing $LiHPO_3F$, $H_2PO_4$ and $LiPF_6$ is mixed, and it has therefore been required to obtain lithium difluorophosphate having higher purity. As its method, it has been considered to purify lithium difluorophosphate by obtaining the powder of lithium difluorophosphate by precipitating the crystal of lithium difluorophosphate from a solution.

However, lithium difluorophosphate tends to be gel due to hydrogen bound, and a method for manufacturing lithium difluorophosphate powder from a solution, method which is capable of being used for industrial production, has therefore not been established. For example, in the patent documents 3 and 4, by a concentration method in which a solvent is removed and a cooling method in which a temperature of a solvent decreases, it is possible to precipitate several tens of grams of lithium difluorophosphate in the level of a laboratory by solid-liquid separation, ignoring a device load. However, the precipitated lithium difluorophosphate is turned into gel with these methods, and consequently, effective recovery of lithium difluorophosphate often becomes difficult, because the solid-liquid separation of several kilograms or greater of lithium difluorophosphate takes a long time.

PRIOR ART REFERENCE(S)

Patent Document(s)

Patent Document 1: Japanese Patent Application Publication H11-67270
Patent Document 2: Japanese Patent Application Publication 2008-222484
Patent Document 3: International Publication 2010/064637
Patent Document 4: International Publication 2013/136533

SUMMARY OF THE INVENTION

Problem(s) to be Solved by the Invention

An object of the present invention is to provide a manufacturing method with which lithium difluorophosphate powder can be obtained from a lithium difluorophosphate solution.

Means for Solving the Problem(s)

The present inventors focus on a poor solvent precipitation method (it is also called as a poor solvent addition crystallization method) for precipitating lithium difluorophosphate by adding a poor solvent having a low solubility to lithium difluorophosphate to a solution containing lithium difluorophosphate, to solve the above problem, and have found that lithium difluorophosphate powder can be efficiently recovered, in a case where there is a specific relation between the octanol/water partition coefficient of a main solvent and the octanol/water partition coefficient of the poor solvent.

That is, the present invention provides a method for manufacturing lithium difluorophosphate powder, including the steps of: precipitating solid lithium difluorophosphate by adding a poor solvent to a solution in which lithium difluorophosphate is dissolved in a main solvent; and obtaining lithium difluorophosphate powder by solid-liquid separation of the solid lithium difluorophosphate from a liquid containing the main solvent and the poor solvent, wherein the relational expression between the octanol/water partition coefficient $P_P$ of the main solvent and the octanol/water partition coefficient $P_A$ of the poor solvent is defined by a formula (1).

$$P_A \geq -4/3 \times P_P + 1.2 \quad (1)$$

It is preferable that the poor solvent is at least one kind selected from the group consisting of a saturated hydrocarbon-based solvent, an aromatic-based solvent, an ether-based solvent and a carbonic acid ester-based solvent, and that the main solvent is at least one kind selected from the group consisting of an ester-based solvent, a ketone-based solvent and an alcohol-based solvent.

Moreover, it is preferable to include the steps of cleaning the obtained solid with (leaning liquid, and removing the cleaning liquid and drying the solid, after the solid-liquid separation.

In addition, the present invention also provides lithium difluorophosphate characterized in that 1000 mass ppm or less of toluene is contained.

Effect(s) of the Invention

According to the present invention, it is possible to provide a manufacturing method with which lithium difluorophosphate powder can be obtained from a lithium difluorophosphate solution.

BRIEF DESCRIPTION OF THE DRAWING(S)

FIG. 1 is a graph in which the result of a first example 1 is plotted when a horizontal axis represents the octanol/water partition coefficient of a main solvent and a vertical axis represents the octanol/water partition coefficient of a poor solvent.

MODE FOR IMPLEMENTING THE INVENTION

In the following, the present invention be explained in detail.

A method for manufacturing lithium difluorophosphate powder of the present invention includes a step of obtaining lithium difluorophosphate powder by solid-liquid separation of solid lithium difluorophosphate from a liquid containing a main solvent and a poor solvent, after the crystal of lithium difluorophosphate is precipitated by adding the poor solvent to a lithium difluorophosphate solution in which lithium difluorophosphate is dissolved in the main solvent. When the poor solvent having a low solubility of lithium difluorophosphate is added to the lithium difluorophosphate solution, the amount of lithium difluorophosphate which can be dissolved in the solution decreases, and lithium difluorophosphate which cannot be dissolved in the solution is precipitated as a crystal. The obtained crystal has a high purity.

Furthermore, it is characterized that the relational expression between the octanol/water partition coefficient $P_P$ of the main solvent and the octanol/water partition coefficient $P_A$ of the poor solvent is defined by the following formula (1).

$$P_A \geq -4/3 \times P_P + 1.2 \quad (1)$$

An octanol/water partition coefficient (Log $P_{OW}$, hereinafter, simply also called "partition coefficient") is a concentration ratio of a chemical substance in two solvent phases of n-octanol and water, when the chemical substance is added to the two solvent phases and becoming an equilibrium state. It is used when the substance is judged if it is hydrophilicity or hydrophobicity and if the value of the partition coefficient is large, the substance has a high hydrophobicity. The octanol/water partition coefficient can be evaluated with a method described in JIS 27260. However, it can be also calculated with a computer.

When the relational expression between the octanol/water partition coefficient $P_P$ of the main solvent and the octanol/water partition coefficient $P_A$ of the poor solvent satisfies the formula (1), it is possible to recover the lithium difluorophosphate powder with a poor solvent precipitation method.

The addition of the poor solvent is preferably performed while stirring the solution to make the whole system uniform.

In addition, a general solid-liquid separation method can be used for the solid-liquid separation, and natural filtration, vacuum filtration, pressure filtration and centrifugal filtration can be also used. In particular, the pressure filtration is used widely and industrially, and it is preferable because filtering speed can be increased.

In addition, it is preferable that the poor solvent is at least one kind selected from the group consisting of a saturated hydrocarbon-based solvent, an aromatic-based solvent, an ether-based solvent and a carbonic acid ester-based solvent. The octanol/water partition coefficients of these solvents tend to be high, and the relational expression of the formula (1) therefore tends to be satisfied.

In addition, it is preferable that the saturated hydrocarbon-based solvent is at least one kind selected from the group consisting of n-hexane (3.90), n-heptane (4.66) and n-octane (5.18), the aromatic-based solvent is at least one kind selected from the group consisting of toluene (2.69), xylene (3.12) and benzene (3.12), and that the ether-based solvent is at least one kind selected from the group consisting of diisopropyl ether (1.52), tetrahydrofuran (0.46) and diethyl ether (0.89), because these solvents are generally distributed and their partition coefficients are relatively high. In addition, a number in parentheses after each substance name is a value of the octanol/water partition coefficient of each of the substances.

It is preferable that the carbonic acid ester-based solvent is at least one kind selected from the group consisting of ethyl methyl carbonate (0.75), dimethyl carbonate (0.354), propylene carbonate (−0.48) and ethylene carbonate (0.11), because these solvents can be used for electrolytes for non-aqueous electrolyte batteries, and when these are used for the electrolytes, problems do not occur even if these solvents remain in solid contents.

It is preferable that the main solvent is at least one kind selected from the group consisting of an ester-based solvent, a ketone-based solvent and an alcohol-based solvent, because the partition coefficients of these solvents tend to be low, and the relational expression of the formula (1) tends to be satisfied.

It is preferable that the ester-based solvent is at least one kind selected from the group consisting of ethyl acetate (0.73), methyl acetate (0.18) and propyl acetate (1.24), the ketone-based solvent is at least one kind selected from the group consisting of acetone (−0.24), methyl ethyl ketone (0.29) and cyclohexanone (0.81), and that the alcohol-based solvent is at least one kind selected from the group consisting of ethanol (−0.32), isopropyl alcohol (0.05), methanol (−0.82) and isobutanol (0.8), because these solvents are generally distributed and the partition coefficients of these solvents are relatively low.

In particular, it is preferable that the octanol/water partition coefficient $P_P$ of the main solvent is −0.40 or greater to 0.80 or less. In this range, in the examples, it has been proved that precipitation efficiency is high in a case where the relational expression of the formula (1) is satisfied.

In particular, it is preferable that the main solvent is ethyl acetate and the poor solvent is toluene. In this combination, the precipitation efficiency is particularly high, as compared with other combinations of the solvents, and furthermore, the lithium difluorophosphate solution is not turned into gel, and a precipitated product can be easily separated by filtration.

When the poor solvent is added to the lithium difluorophosphate solution, the amount of the poor solvent to be added is preferably 0.1-5 mass times, more preferably 0.2-2 mass times, further preferably 0.4-1 mass times, relative to the mass of the solution. If the amount of the poor solvent is too small, the precipitation efficiency deteriorates, and if the amount of the poor solvent is large, when the precipitated product is separated by filtration, the amount of filtrate increases, and the filtration takes time, and moreover, the amount of waste increases.

Moreover, it is preferable to include the steps of cleaning an obtained solid with cleaning liquid, removing the cleaning liquid, and drying after the solid-liquid separation. As the cleaning liquid, a saturated hydrocarbon-based solvent, an aromatic-based solvent, an ether-based solvent and a carbonic acid ester-based solvent, which can be used as the poor solvent, can be used. By the cleaning step, an excess solid content can be removed, and by the drying step, the solvent contained in the solid content is volatilized, and it can be removed.

When lithium difluorophosphate is manufactured by a well-known manufacturing method, there is almost no possibility that reaction is completely proceeded, and only lithium difluorophosphate is produced. In general, a lithium difluorophosphate solution is obtained which contains non-target substances, such as unreacted starting substances, side reaction products and decomposition products under reaction, as impurities. The amount of the impurities is approximately 1-50 mass %, generally 5-25 mass %, relative to the amount of lithium difluorophosphate. By applying the method for manufacturing the lithium difluorophosphate powder of the present invention to the lithium difluorophosphate solution containing those impurities, it is possible to obtain high purity lithium difluorophosphate powder in which the content of the impurities have been reduced, and lithium difluorophosphate can be purified. As a method for manufacturing lithium difluorophosphate, there can be used a method described in a patent document 2, method in which halides other than fluoride, $LiPF_6$ and water are reacted in a non-aqueous solvent, a method described in a patent document 3, method in which diphosphorus pentoxide, lithium hexafluorophosphate and hydrogen fluoride are reacted, and a method described in a patent document 4, method in which difluorophosphate and lithium chloride are reacted. In addition, the purity of the lithium difluorophosphate powder obtained with the manufacturing method of the present invention is high because crystal precipitation process is carried out. The purity of the lithium difluorophosphate powder is generally 95 mass % or greater, preferably 98 mass % or greater, more preferably 99 mass % or greater.

In addition, there is a case where the lithium difluorophosphate powder manufactured by applying the present method contains the used poor solvent within a range of 50 mass ppm or greater to 1000 mass ppm or less.

EXAMPLES

Example 1

Lithium difluorophosphate was added to 10 g of a main solvent until saturated at a room temperature (25° C.). A predetermined amount of a poor solvent was added to this solution. One night later, the mixed liquid was pressure-filtered (pressure: 0.4 MPaG, filter: polytetrafluoroethylene porous membrane having a pore diameter of 0.5 μm), and the amount of lithium difluorophosphate powder in a residue was determined by determining the amount of lithium difluorophosphate in filtrate.

A value obtained by dividing the amount of the lithium difluorophosphate powder in the residue by the amount of lithium difluorophosphate contained in the saturated solution before adding the poor solvent was set as precipitation efficiency. In addition, the solution after adding the poor solvent was visually confirmed, and one which was capable of being stirred but which had a high viscosity was expressed as jelly, and one having a high viscosity which was not capable of being stirred was expressed as gel.

The kinds of the main solvent and the poor solvent which were used, and the amount of the poor solvent to be added to the solution were changed and shown in the following Table 1 and Table 2. In addition, EtOAc is ethyl acetate, IPE is diisopropyl ether, THF is tetrahydrofuran, EMC is ethyl methyl carbonate, DMC is dimethyl carbonate, PC is propylene carbonate and EC is ethylene carbonate, in the tables. Each of their partition coefficients is shown in Table 3.

TABLE 1

| Main solvent (partition coefficient) | Poor solvent (partition coefficient) | Addition amount [mass times] | Poor solvent concentration [mass %] | Precipitation efficiency (vs saturated solution) [%] | Note |
|---|---|---|---|---|---|
| EtOAc (0.73) | Toluene (2.69) | 0.2 | 19.8% | 68.9% | |
|  |  | 0.4 | 33.1% | 82.3% | |
|  |  | 0.8 | 49.8% | 86.1% | |
|  | Hexane (3.9) | 0.1 | 11.0% | 58.4% | Gel or jelly immediately after mixing → Cloudy liquid, one night later |
|  |  | 0.2 | 19.8% | 74.5 | Gel or jelly immediately after mixing → Cloudy liquid, one night later |
|  |  | 0.6 | 42.6% | 85.9% | Gel or jelly immediately after mixing → Cloudy liquid, one night later |

TABLE 1-continued

| Main solvent (partition coefficient) | Poor solvent (partition coefficient) | Poor solvent Addition amount [mass times] | Poor solvent concentration [mass %] | Precipitation efficiency (vs saturated solution) [%] | Note |
|---|---|---|---|---|---|
| | IPE (1.52) | 0.1 | 11.0% | 51.0% | |
| | | 0.3 | 27.1% | 77.1% | Gel or jelly immediately after mixing → Cloudy liquid, one night later |
| | | 0.8 | 49.7% | 86.0% | Gel or jelly immediately after mixing → Cloudy liquid, one night later |
| | THF (0.46) | 0.2 | 19.8% | 33.1% | |
| | | 0.6 | 42.6% | 68.9% | |
| | | 1.0 | 55.3% | 65.0% | |
| | EMC (0.75) | 1.0 | 55.3% | 25.0% | No precipitation immediately after mixing (one night later, slight precipitation) |
| | DMC (0.354) | 1.0 | 55.3% | 22.4% | No precipitation immediately after mixing (one night later, slight precipitation) |
| | PC (−0.48) | 1.0 | 55.3% | 0.0% | |
| | EC (0.11) | 1.0 | 55.3% | 0.0% | |
| Acetone (−0.24) | Toluene (2.69) | 0.1 | 13.4% | 23.3% | |
| | | 0.3 | 23.6% | 45.5% | |
| | | 0.8 | 48.2% | 71.2% | |
| | Hexane (3.9) | 0.1 | 13.4% | 44.4% | |
| | | 0.3 | 23.6% | 63.2% | Jelly → Jelly, one night later |
| | | 0.6 | 43.6% | 77.2% | Jelly → Jelly, one night later |
| | IPE (1.52) | 0.1 | 13.4% | 34.8% | |
| | | 0.3 | 23.6% | 55.8% | Jelly → Jelly, one night later |
| | | 0.6 | 43.6% | 73.6% | Jelly → Jelly, one night later |
| | THF (0.46) | 0.1 | 13.4% | 0.0% | |
| | | 0.3 | 23.6% | 0.0% | |
| | | 0.6 | 43.6% | 17.3% | |
| | EMC (0.75) | 0.6 | 43.6% | 0.0% | |
| | DMC (0.354) | 0.6 | 43.6% | 0.0% | |
| | PC (−0.48) | 0.6 | 43.6% | 0.0% | |
| | EC (0.11) | 0.6 | 43.6% | 0.0% | |

TABLE 2

| Main solvent (partition coefficient) | Poor solvent (partition coefficient) | Poor solvent Addition amount [mass times] | Poor solvent concentration [mass %] | Precipitation efficiency (vs saturated solution) [%] | Note |
|---|---|---|---|---|---|
| IPA (0.05) | Toluene (2.69) | 0.2 | 20.9% | 14.4% | Gel, one night later |
| | | 0.4 | 34.6% | 35.6% | Gel, one night later |
| | | 0.7 | 48.0% | 52.9% | Gel, one night later |
| | Hexane (3.9) | 0.2 | 20.9% | 36.5% | Gel, one night later |
| | | 0.4 | 34.6% | 55.4% | Gel, one night later |
| | | 0.7 | 48.0% | 70.7% | Gel, one night later |
| | IPE (1.52) | 0.2 | 20.9% | 1.6% | |
| | | 0.4 | 34.6% | 27.1% | |
| | | 0.7 | 48.0% | 48.7% | |
| | THF (0.46) | 0.2 | 20.9% | 0.0% | |
| | | 0.4 | 34.6% | 0.0% | |
| | | 0.7 | 48.0% | 0.0% | |
| | EMC (0.75) | 0.9 | 54.3% | 0.0% | |
| | DMC (0.354) | 0.9 | 54.3% | 0.0% | |
| | PC (−0.48) | 0.9 | 54.3% | 0.0% | |

TABLE 2-continued

| Main solvent (partition coefficient) | Poor solvent (partition coefficient) | Addition amount [mass times] | Poor solvent concentration [mass %] | Precipitation efficiency (vs saturated solution) [%] | Note |
|---|---|---|---|---|---|
| | EC (0.11) | 0.9 | 54.3% | 0.0% | |
| Ethanol (−0.32) | Toluene (2.69) | 0.2 | 25.8% | 3.6% | |
| | | 0.4 | 41.0% | 10.2% | |
| | | 0.7 | 54.9% | 20.2% | Partial separation into two layers |
| | Hexane (3.9) | 0.2 | 25.8% | 6.8% | Separation into two layers |
| | | 0.4 | 41.0% | 29.0% | Separation into two layers |
| | | 0.7 | 54.9% | 85.0% | Separation into two layers |
| | IPE (1.52) | 0.2 | 25.8% | 0.0% | |
| | | 0.4 | 41.0% | 0.0% | |
| | | 0.7 | 54.9% | 0.0% | |
| | THF (0.46) | 0.2 | 25.8% | 0.0% | |
| | | 0.4 | 41.0% | 0.0% | |
| | | 0.7 | 54.9% | 0.0% | |
| | EMC (0.75) | 1.0 | 63.5% | 0.0% | |
| | DMC (0.354) | 1.0 | 63.5% | 0.0% | |
| | PC (−0.48) | 1.0 | 63.5% | 0.0% | |
| | EC (0.11) | 1.0 | 63.5% | 0.0% | |

TABLE 3

| Name | Log $P_{OW}$ (partition coefficient) |
|---|---|
| AcOEt (ethyl acetate) | 0.73 |
| Acetone | −0.24 |
| IPA (isopropyl alcohol) | 0.05 |
| Ethanol | −0.32 |
| Hexane (n-hexane) | 3.9 |
| Toluene | 2.69 |
| IPE (diisopropyl ether) | 1.52 |
| THF (tetrahydrofuran) | 0.46 |
| EMC (ethyl methyl carbonate) | 0.75 |
| DMC (dimethyl carbonate) | 0.354 |
| PC (propylene carbonate) | −0.48 |
| EC (ethylene carbonate) | 0.11 |

In addition, in FIG. 1, a horizontal axis represents the partition coefficient of the main solvent and a vertical axis represents the partition coefficient of the poor solvent. As to the maximum value of the precipitation efficiency of each combination of the main solvents and the poor solvents, less than 20% is expressed as "×", 20% or greater to less than 45% is expressed as "Δ", 45% or greater to less than 70% is expressed as "○" and 70% or greater is expressed as "●", and results were plotted in FIG. 1. A line in FIG. 1 is a line in a case where the relational expression between the octanol/water partition coefficient $P_P$ of the main solvent and the octanol/water partition coefficient $P_A$ of the poor solvent is defined by the following formula.

$$P_A \geq -4/3 \times P_P + 1.2$$

As shown in FIG. 1, in a region above the line showing the relational expression between $P_P$ and $P_A$, the maximum precipitation efficiency exceeds 20%, and it is understood that the precipitation efficiency is relatively high.

In particular, in a case where ethyl acetate was used as the main solvent and toluene was used as the poor solvent, the precipitation efficiency was high, and gelation and separation in the solution did not occur. It can be therefore used for industrially manufacturing lithium difluorophosphate powder, and is particularly preferable.

Example 2

Poor solvent addition in which the combination of ethyl acetate and toluene had been used, combination which was made clear that it was the most preferable combination of the main solvent and the poor solvent in Example 1, was applied to a manufacturing step for lithium difluorophosphate powder.

[Synthesis]

Lithium difluorophosphate was synthesized, as follows, with reference to a method described in a patent document 2 for manufacturing lithium difluorophosphate.

8.8 kg (57.9 mol) of $LiPF_6$ was dissolved in 32.2 kg of ethyl acetate, and 7.9 kg (186.8 mol) of lithium chloride was added, following which it was stirred at 35° C. while adding 1.7 kg (97.0 mol) of water. This reaction liquid was depressurized at 35° C., 11 kg of a solvent was distilled off, and hydrogen chloride as a by-product was removed. The free acid of this solution was analyzed by a titration method. It was 4700 ppm converted as HF.

Next, the reaction liquid obtained in this way was analyzed with $^{19}$F-NMR. It was confirmed that this reaction liquid contained 1.5 kg (9.6 mol) of $LiPF_6$, 5.2 kg (47.9 mol) of lithium difluorophosphate and 0.05 kg (0.4 mol) of $LiHPO_3F$, and reaction proceeded almost quantitatively.

As to this reaction liquid, pressure filtration (pressure: 0.2 MPaG, filter: polytetrafluoroethylene membrane having a pore diameter of 0.5 μm) was performed, and lithium fluoride as a by-product generated by the reaction was separated by the filtration, and a solution containing 20.2% of lithium difluorophosphate was obtained.

[Poor Solvent Precipitation Method]

38.1 kg (1.55 times with respect to a lithium difluorophosphate solution, in mass ratio) of toluene was added to 24.6 kg of the ethyl acetate solution containing 20.2% of lithium difluorophosphate, which was obtained by the above-mentioned synthesis, and it was stirred for a hundred minutes, following which solids were precipitated. However, it was not turned into gel, and pressure filtration (pressure: 0.2 MPaG, filter: polytetrafluoroethylene membrane having a pore diameter of 0.5 μm) was therefore performed, and a residue was obtained. The filtration was completed without occurrence of clogging, etc., because gelation did not occur, and filtration performance was 5.97 kg per hour.

The residue was cleaned with ethyl methyl carbonate and dried for eight hours at 100° C., and powder was obtained.

The obtained powder was lithium difluorophosphate having a purity of 99.7 mass %. The amount of each impurity was shown in the following table. In addition, phosphorus-atom-based recovery rate was 94.5%.

TABLE 4

| Composition in solid content (mass %) | | | | Acid concentration in solid content (HF conversion) (mass ppm) | Chlorine concentration in solid content (mass ppm) | Solvent concentration in solid content (mass ppm) | | |
|---|---|---|---|---|---|---|---|---|
| $LiPO_2F_2$ | $LiPF_6$ | $LiHPO_3F$ | LiF | | | EtOAc | EMC | Toluene |
| 99.71 | 0.00 | 0.00 | 0.17 | 448 | 16 | 500 | 600 | 100 |

Comparative Example 1

When an ethyl acetate solution containing lithium difluorophosphate and impurities, which had been obtained with the same method as that of Example 2, was cooled down to 5° C., it became a supersaturated state, and solids were not precipitated. The same experiment was conducted again, and solids were precipitated. However, gelation occurred at the moment when the solids were precipitated, and consequently, filtration became difficult.

As the above, when a poor solvent precipitation method, in which toluene as the poor solvent was added, was applied to the ethyl acetate solution of lithium difluorophosphate containing impurities, such as unreacted $LiPF_6$ and $LiHPO_3F$ as a reaction by-product, lithium difluorophosphate powder having high purity was obtained at a high recovery rate without gelation.

The invention claimed is:

1. A method for manufacturing lithium difluorophosphate powder, comprising the steps of:
    precipitating solid lithium difluorophosphate by adding a poor solvent to a solution in which lithium difluorophosphate is dissolved in a main solvent; and
    obtaining the lithium difluorophosphate powder by solid-liquid separation of the solid lithium difluorophosphate from a liquid containing the main solvent and the poor solvent,
    wherein a relational expression between an octanol/water partition coefficient $P_P$ of the main solvent and an octanol/water partition coefficient $P_A$ of the poor solvent is defined by a formula (1)

$$P_A \geq -4/3 \times P_P + 1.2. \quad (1):$$

2. The method for manufacturing the lithium difluorophosphate powder according to claim 1, wherein the poor solvent is at least one selected from the group consisting of a saturated hydrocarbon-based solvent, an aromatic-based solvent, an ether-based solvent and a carbonic acid ester-based solvent.

3. The method for manufacturing the lithium difluorophosphate powder according to claim 2, wherein the saturated hydrocarbon-based solvent is at least one selected from the group consisting of n-hexane, n-heptane and n-octane.

4. The method for manufacturing the lithium difluorophosphate powder according to claim 2, wherein the aromatic-based solvent is at least one selected from the group consisting of toluene, xylene and benzene.

5. The method for manufacturing the lithium difluorophosphate powder according to claim 2, wherein the ether-based solvent is at least one selected from the group consisting of diisopropyl ether, tetrahydrofuran and diethyl ether.

6. The method for manufacturing the lithium difluorophosphate powder according to claim 2, wherein the carbonic acid ester-based solvent is at least one selected from the group consisting of ethyl methyl carbonate, dimethyl carbonate, propylene carbonate and ethylene carbonate.

7. The method for manufacturing the lithium difluorophosphate powder according to claim 1, wherein the main solvent is at least one selected from the group consisting of an ester-based solvent, a ketone-based solvent and an alcohol-based solvent.

8. The method for manufacturing the lithium difluorophosphate powder according to claim 7, wherein the ester-based solvent is at least one selected from the group consisting of ethyl acetate, methyl acetate and propyl acetate.

9. The method for manufacturing the lithium difluorophosphate powder according to claim 7, wherein the ketone-based solvent is at least one selected from the group consisting of acetone, methyl ethyl ketone and cyclohexanone.

10. The method for manufacturing the lithium difluorophosphate powder according to claim 7, wherein the alcohol-based solvent is at least one selected from the group consisting of ethanol, isopropanol, methanol and isobutanol.

11. The method for manufacturing the lithium difluorophosphate powder according to claim 1, wherein the octanol/water partition coefficient $P_P$ of the main solvent is −0.40 or greater to 0.80 or less.

12. The method for manufacturing the lithium difluorophosphate powder according to claim 1, wherein the main solvent is ethyl acetate, and the poor solvent is toluene.

13. The method for manufacturing the lithium difluorophosphate powder according to claim 1, an amount of the poor solvent to be added to the solution is 0.1-5 mass times, relative to the solution.

14. The method for manufacturing the lithium difluorophosphate powder according to claim 1, comprising, after the solid-liquid separation, the steps of:
    cleaning an obtained solid with cleaning liquid; and
    removing the cleaning liquid, and drying the solid.

15. Lithium difluorophosphate, wherein 50 mass ppm or greater to 1000 mass ppm or less of at least one selected from the group consisting of n-heptane, toluene, xylene, benzene, and diisopropyl ether is contained.

* * * * *